United States Patent [19]

Annemaier et al.

[11] Patent Number: 5,496,881
[45] Date of Patent: Mar. 5, 1996

[54] COMPOSITION FOR FORMING FIREPROOF COATINGS AND CAULKING AND A METHOD OF USE

[75] Inventors: Dieter Annemaier, Illerkirchberg; Robert Graf, Alltenstadt-Filzingen, both of Germany

[73] Assignee: Chemische Fabrik Gruenau GmbH, Illertissen, Germany

[21] Appl. No.: 256,029

[22] PCT Filed: Dec. 15, 1992

[86] PCT No.: PCT/EP92/02908

§ 371 Date: Jun. 21, 1994

§ 102(e) Date: Jun. 21, 1994

[87] PCT Pub. No.: WO93/13183

PCT Pub. Date: Jul. 8, 1993

[30] Foreign Application Priority Data

Dec. 24, 1991 [DE] Germany .................... 41 42 903.6

[51] Int. Cl.⁶ .................... C08J 5/10; C08K 3/34; C08L 23/00
[52] U.S. Cl. .................... 524/443; 524/140; 524/141; 524/143; 524/145; 524/404; 524/405; 524/415; 524/416; 524/417; 524/492; 524/493; 524/494
[58] Field of Search .................... 524/140, 141, 524/143, 145, 404, 405, 415, 416, 417, 443, 492, 493, 494

[56] References Cited

U.S. PATENT DOCUMENTS

| | | | |
|---|---|---|---|
| 3,639,331 | 2/1972 | Hattori | 524/140 |
| 3,827,933 | 8/1974 | Duggins | 524/436 |
| 3,833,535 | 9/1974 | Wambach | 524/141 |
| 4,292,235 | 9/1981 | Uemoto | 524/145 |
| 4,604,413 | 8/1986 | Nabeta | 524/143 |
| 5,071,894 | 12/1991 | Weil | 524/415 |
| 5,276,256 | 1/1994 | Niessner | 524/140 |
| 5,292,786 | 3/1994 | Gagger | 524/141 |
| 5,302,646 | 4/1994 | Vilasagar | 524/140 |

FOREIGN PATENT DOCUMENTS

| | | |
|---|---|---|
| 0281226 | 9/1988 | European Pat. Off. . |
| 0459784 | 12/1991 | European Pat. Off. . |
| 2039969 | 11/1971 | Germany . |
| 2065117 | 5/1973 | Germany . |
| 2724604 | 12/1978 | Germany . |
| 2844693 | 4/1979 | Germany . |
| 3637923 | 5/1988 | Germany . |
| 62564 | 1/0000 | Japan . |
| 7041003 | 1/1987 | Japan . |

OTHER PUBLICATIONS

DIN 4102, Part 1 (Class B1 Building Materials—Flame-Resistant Building Materials.

*Primary Examiner*—Paul R. Michl
*Assistant Examiner*—U. K. Rajguru
*Attorney, Agent, or Firm*—Wayne C. Jaeschke; John Daniel Wood; Daniel S. Ortiz

[57] ABSTRACT

The invention is an aqueous composition for forming fireproof coatings and caulking. The composition is halogen, asbestos and antimony-free. The composition contains 5–20% by weight of a binder resin; 10–60% by weight of a particulate flameproofing agent; 0.2 to 27.5% by weight of non-asbestos inorganic fibers with an average length of 300 micron; 0.1 to 10% by weight of a plasticizer; and water.

37 Claims, No Drawings

5,496,881

COMPOSITION FOR FORMING FIREPROOF COATINGS AND CAULKING AND A METHOD OF USE

BACKGROUND OF THE INVENTION

1. Field of the Invention

This invention relates to a fireproofing compound containing binders, flameproofing agents, fibers and plasticizers and to the use of the fireproofing compound.

2. Discussion of Related Art

In the building industry in particular, the structural elements used, such as for example ceilings, walls, partitions, girders and columns etc., must have adequate fire resistance. To this end, there are legal provisions which stipulate the period for which the structural elements have to withstand a fire. Openings in such structural elements (for cables and slots for tubes or joints) have to show the same fire resistance as the structural elements in which they are situated. Accordingly, a number of fireproofing compounds are used, for example, to coat the structural elements to make them fireproof or to increase the fire resistance of the sealing systems for the openings.

The sheaths and insulations of electrical cables and plastic pipes consist of inflammable materials which, after ignition, can spread the fire very quickly and which, in addition, conceal the danger of filling workshops and escape routes with smoke and, at the same time, of forming corrosive or toxic combustion products. These risks can generally be minimized by fireproof coatings.

DE-PS 20 65 117 describes a fireproofing compound which contains chlorinated hydrocarbons, antimony trioxide and asbestos fibers in addition to other substances in an aqueous polymer emulsion. This compound is used as a protective coating for electrical cables. In the event of fire, however, the chlorine-containing compound gives off not only chlorine compounds, but also hydrogen chloride gas which is both toxic and highly corrosive. In addition, the fireproofing compound described in DE-OS 20 65 117 contains antimony trioxide which is regarded as a carcinogenic substance and also asbestos fibers which are now known to have a health-damaging effect.

DE-PS 20 39 969 also describes a fireproofing compound containing chlorinated hydrocarbons. The compound in question may also contain asbestos and antimony compounds as further components. Accordingly, the fireproofing compound according to DE-PS 20 39 969 also has the unfavorable properties mentioned above and shows adverse health-damaging effects.

Although the fireproofing compound disclosed in DE-OS 27 24 604 avoids the use of asbestos fibers, it still contains chlorinated hydrocarbons and antimony trioxide. Accordingly, the fireproofing compound according to this document also shows unfavorable health-damaging effects.

The use of a fire-retarding compound for coating electrical cables and lining cable runways is described in DE-PS 28 44 693. The problem addressed by the invention to which this document relates was to modify the fireproofing compound described in DE-PS 20 39 969 in such a way that asbestos need no longer be used. However, the compound used in accordance with DE-PS 28 44 693 still contains an organic halogen compound and, optionally, antimony compound which leads to the disadvantages already described.

Halogen-free fireproofing compounds are also known from the prior art, but contain large quantities of health-damaging antimony compounds, such as antimony trioxide for example. Despite a high content of antimony compounds, these known fireproofing compounds show poor fireproofing properties. For example, cables with a halogen-free sheath and a halogen-free insulation, such as telephone cables with PE sheaths and insulations, cannot be protected with a commercially available product of this type in such a way that the requirements of DIN 4102, Part 1 (Class B1 Building Materials—Flame-Resistant Building Materials) are satisfied.

On account of the risks attending fires involving PVC cables (heavy smoke generation, evolution of toxic and corrosive gases), numerous attempts have also been made to replace PVC by polyolefins or by halogen-free elastomers. However, the fire risks attending these new types of cables are often no less than those attending PVC cables and can even be greater.

SUMMARY OF THE INVENTION

The problem addressed by the present invention was to provide a fireproofing compound which would be far less problematical to the environment and to human health than known fireproofing compounds. The fireproofing properties of the compound obtained would nevertheless be good and, in particular, would satisfy legal requirements. In addition, the fireproofing compound would also be capable above all of effectively protecting the PVC-free cables now appearing on the market in all industrial countries against ignition and fire propagation.

DETAILED DESCRIPTION OF THE INVENTION

This problem has been solved by a fireproofing compound of the type mentioned above which is free from antimony compounds, asbestos and health-damaging, more particularly halogen-containing flame retardants. Surprisingly, the absence of antimony compounds, asbestos and the health-damaging, preferably halogen-containing flame retardants does not impair the fireproofing properties of the compound. Building regulations relating to the fireproofing properties are fulfilled. At the same time, the fireproofing compound obtained is ecologically safe and physiologically harmless because it does not contain any antimony compounds or asbestos and because no health-damaging substances, such as in particular halogenated hydrocarbons, other halogen compounds or free halogens, are released from the flame retardants in the event of fire. The fireproofing compound according to the invention shows high thermal conductivity at service temperatures. The effect of this is that the heat generated in the case of cables under electrical loads is effectively dissipated.

In a preferred embodiment of the invention, not only the flame retardants, but also the fireproofing compound as a whole are halogen-free. More particularly, the fireproofing compound as a whole may be chlorine-free in this case because chlorine compounds in particular are used as constituents of conventional fireproofing compounds. The described absence of halogens provides for even better environmental compatibility of the fireproofing compound because no toxic or corrosive hydrogen halides or other halogen compounds can be released in the event of fire.

The binders used in the fireproofing compound are preferably aqueous dispersions of plastics or synthetic resins which are preferably halogen-free. Typical homopolymers, copolymers or terpolymers may be used as binders, copolymers or terpolymers being preferred. Ethylene, vinyl laurate, versatate and acrylate are mentioned as examples of suitable halogen-free comonomers. Copolymers containing at least one vinyl acetate component are particularly advantageous. The vinyl acetate component acts as a particularly effective coupling agent between the constituents of the fireproofing compound and between the fireproofing compound and the substrate to which it is applied. Preferred binders are, for example, ethylene/vinyl acetate copolymers.

The polymers and, in particular, copolymers suitable for use in accordance with the invention preferably have a glass transition temperature $T_g$ above $-30°$ C., a minimum film forming temperature MFT of $\geq 0°$ C., a tensile strength of $\leq 5$ N/mm$^2$ and an elongation at break of $\leq 400\%$. Copolymers such as these provide the fireproofing compound with good consistency and, hence, processability and enable the fireproofing compound applied to a substrate to develop good mechanical physical properties.

According to the invention, the binder is preferably present in a quantity of 5 to 20% by weight and, more particularly, 7.5 to 15% by weight binder dry matter, based on the fireproofing compound as a whole (wet). The consistency and viscosity of the fireproofing compound can be varied over a wide range by changing the quantity of binder. The quantity of binder may be changed in coordination with the content of other constituents of the fireproofing compound, such as fillers for example, in order specifically to adjust the fireproofing compound to a certain consistency.

The substances present as flameproofing agents in the fireproofing compound according to the invention are preferably halogen-free and/or free from toxicologically and ecologically unsafe compounds, more particularly heavy metal compounds. It is specifically this measure which contributes towards ensuring that an ecologically safe fireproofing compound is obtained. The substances mentioned are preferably insoluble in water. The advantage of this is that they cannot be dissolved out from the fireproofing compound over a period of time if the fireproofing compound comes into contact with atmospheric moisture or otherwise with water.

The flameproofing agent is preferably present in the fireproofing compound in a quantity of 10 to 60% by weight and, more particularly, 20 to 50% by weight, these quantities being based on the total quantity of fireproofing compound in its wet phase.

The flameproofing agents used are, in particular, inorganic solids which react endothermally on heating (i.e., for example, in the event of fire). This endothermal reaction is preferably reflected in melting, sublimation, phase transition or in a solid-state reaction. The endothermal reaction may be accompanied by the elimination of gases, preferably non-inflammable gases. The gases eliminated which escape from the fireproofing compound in the event of fire are, for example, water (in the form of steam or gas), carbon dioxide and ammonia. The solids used as flameproofing agents preferably have an average particle diameter of 1 to 50 μm and, more particularly, an average particle diameter of 2 to 30 μm. The particle fineness greatly increases the reactivity of the flameproofing agent.

The described flameproofing agents may be, for example, hydroxides, carbonates, phosphates, borates or stannates. Examples of such compounds are aluminium hydroxide, zinc borate, ammonium polyphosphate, magnesium hydroxocarbonate and magnesium hydroxide. Other suitable compounds are zinc stannate and zinc hydroxostannate. These compounds mentioned by way of example develop their flameproofing effect above different temperatures. Magnesium hydroxide, for example, develops its flameproofing effect at higher temperatures than the other compounds mentioned while magnesium hydroxocarbonate develops its effect over a broad temperature range. These compounds mentioned generally and by way of example may also be used in the form of mixtures. The advantage of this is that the temperatures at which the flameproofing effect is developed can be varied or adjusted in dependence upon the constituents and composition of the mixture. Where mixtures are used, a combination of aluminium and zinc compounds is advantageous because mixtures such as these develop effects which go beyond the sum of the individual effects (synergism). For example, zinc stannate and zinc hydroxostannate may be used in combination with aluminium hydroxide.

According to the invention, mixtures of 80 to 98% by weight aluminium hydroxide and 2 to 20% by weight zinc borate may be used with particular advantage as the flameproofing agent.

The fibers which the fireproofing compound contains are preferably present in a total quantity of 0.2 to 27.5% by weight, based on the fireproofing compound as a whole (wet). In a preferred embodiment of the-invention, only inorganic fibers are used in the flameproofing compound. The inorganic fibers provide the fireproofing compound with greater surface roughness which distinctly improves its dissipation of heat at service temperatures, for example where it is used as a cable fireproofing compound. In addition, these fibers improve the mechanical properties of the coating (less sensitivity to cracking under mechanical load, such as bending etc.) and, in addition, prevent the fireproofing layer from bursting in the event of fire.

Another preferred fireproofing compound according to the invention contains a mixture of inorganic and organic fibers. Since the organic fibers have a greater surface structure by comparison with the inorganic fibers, the durability and adhesiveness of the fireproofing compound as a whole are increased by the incorporation of these fibers. The surface roughness of the fireproofing compound, its mechanical properties and its processability can be varied through the mixing ratio of inorganic to organic fibers. In mixtures such as these, the inorganic and organic fibers are respectively present in quantities of 0.1 to 20% by weight and 0.1 to 7.5% by weight, based on the fireproofing compound as whole (wet), contents of 0.5 to 10% by weight inorganic fibers and 0.1 to 3.5% by weight organic fibers again being preferred.

The inorganic fibers preferably have an average thickness of 10 μm and an average length of 300 μm. The organic fibers preferably have an average thickness of 15 μm and an average length of 1000 μm. The inorganic fibers may be slag, mineral, glass and ceramic fibers. Organic fibers are, for example, polyethylene, polyoxymethylene, polypropylene, polyester, polyacrylonitrile, polyamide, viscose or cellulose fibers.

The plasticizers in the fireproofing compound according to the invention are preferably present in a quantity of 0.1 to 2% by weight and, more particularly, in a quantity of 1 to 5% by weight, again based on the fireproofing compound as a whole (wet). Preferred plasticizers are toxicologically safe phosphoric acid esters which, more particularly, are halogen-free. The phosphoric acid esters may have a phosphorus content of $\geq 7\%$. At least one acid function of the phosphoric acid ester may be saturated with an aromatic radical.

The fireproofing compound according to the invention may contain fillers and/or thickeners of the type typically used in fireproofing compounds as further constituents. Such fillers are, for example, talcum, limestone, shell lime, chalk, dolomite, magnesite, basalt, mica or feldspar. Suitable thickeners are, for example cellulose derivatives, such as hydroxymethyl or hydroxyethyl cellulose, alginates or galactomannans. The fireproofing compound according to the invention may also usefully contain typical preservatives, typical dispersants, wetting agents and foam inhibitors which improve the stability of the fireproofing compound and facilitate its production.

According to the invention, the described fireproofing compound may be used for the production of fireproof coatings and fireproof closures. For example, it may be used for coating cables, partitions or surfaces of other structural elements. In this case, the fireproofing compound is directly applied to the cables for example. The fireproofing compound may also be used to coat steel, for example in the form of steel plates or steel girders, to provide protection against high temperatures. Typical fireproof closures in which the fireproof compound may be used are, for example, seals and pointings.

The consistency or rather viscosity of the fireproofing compound may be adjusted according to the particular application or the method of application. Depending on its viscosity, the fireproofing compound may be applied by extrusion coating, spread coating, spray coating, knife coating, brush coating, etc. Thus, the viscosity of the fireproofing compound may be adjusted in such a way that it has the consistency of liquid chocolate. This compound may advantageously be used for application in thick layers of, for example, 4 mm or for applications where the fireproofing compound has to be applied vertically or overhead.

The viscosity of the fireproofing compound may be adjusted through the content of binder, fibers or filler. Water or a typical thixotropic agent, such as for example cellulose ether, alginate or galactomannan, may also be added to the compound.

The present invention also relates to a dry, compact fireproofing material in the form of a coating and/or fireproof closure. This fireproofing material is produced using the described fireproofing compound and is free from antimony compounds, asbestos and health-damaging flame retardants, more particularly halogen-containing flame retardants. After application of the described fireproofing compound, the fireproofing material according to the invention is situated, for example, on the surface of cables, partitions or surfaces of structural components or is present as a joint sealing material.

The fireproofing material as a whole is preferably free from halogen, more particularly chlorine. The fireproofing material according to the invention has the advantage of greater environmental compatibility than known fireproofing materials.

At temperatures of 100° to 800° C., the fireproofing material according to the invention changes from a soft and flexible state into a brittle and hard state. The resulting greater mechanical strength can have a positive effect in the event of fire, for example because the fireproofing material offers greater resistance to an extinguishing jet of water under high pressure. More particularly, the fireproofing material is water- and weather-resistant and combines permanent flexibility with an ablative effect. Accordingly, it is capable of developing its fireproofing effect even after prolonged periods and in an environment in which the fireproofing material is exposed to moisture, weathering or mechanical loads.

Further features of the invention will become apparent from the following description of preferred embodiments in conjunction with the subsidiary claims. The individual features may be embodied either individually or in combination with one another.

EXAMPLE 1

13.1% by weight water are introduced into a stirred vessel with 0.3% by weight of a hydroxymethyl cellulose, 0.4% by weight preservative based on triazolidinopyridazinedione derivatives and 0.6% by weight dispersant based on anionic acrylic copolymers. 5% by weight glass fibers (diameter 8–16 μm, length 0.1–2000 μm) and 0.75% by weight polyethylene fibers (diameter 5–20 μm, length 800–1500 μm) are then added with stirring. After a dispersion time of 30 minutes, 34.0% by weight of a 50% aqueous vinyl acetate/versatate copolymer dispersion are added, after which 5% by weight of a diphenyl decyl phosphate, 35% by weight aluminium hydroxide, 2.5% by weight zirconium borate and 3.35% by weight calcium carbonate are successively introduced. A highly viscous coating compound is obtained. This compound is applied in a dry layer thickness of 2.5 mm to a cable group consisting of three PVC cables (NYY-J, 3×1.5 mm$^2$). The coating film has a Shore A hardness of 36, a tensile strength of 0.2 N/mm$^2$ and an elongation at break of 195%. With a residual length of > 30 cm, the applied compound passes the SS 424 14 75 Class F 3 test.

EXAMPLE 2

An aqueous thickener solution consisting of 24% by weight water, 0.4% by weight hydroxyethyl cellulose, 0.8% by weight dispersant based on anionic acrylic copolymers and 0.4% by weight preservative based on triazolidinopyridazinedione derivatives is prepared in a ball mill. 25.5% by weight aluminium hydroxide and 9.2% by weight zinc borate are then added for grinding to a grindometer value of <63 μm. 18.5% by weight of a 56% polyvinyl acetate/ethylene copolymer dispersion and a mixture of 1.5% by weight glass fibers (diameter 8–16 μm, length 0.1–2000 μm) and 3.2% by weight cellulose fibers (diameter 5–30 μm, length 0.1 to 2000 μm) and also 2.1% by weight of a diphenyl cresyl phosphate and 14.4% by weight calcium carbonate are added to the ground material in a dissolver. A highly viscous fireproof coating compound is obtained. This compound is applied in a dry layer thickness of 2.5 mm to a cable group of three PVC cables (NYY-J 3×1.5 mm$^2$). The coating film has a Shore A hardness of 83, a tensile strength of 1.6 N/mm$^2$ and an elongation at break of 10%. With a residual length of >30 cm, the coating passes the SS 424 14 75 Class F 3 test.

EXAMPLE 3

A thickener solution consisting of 25% by weight of a 60% vinyl acetate homopolymer dispersion, 14.4% by weight water and 1.0% by weight of a hydroxymethyl cellulose is prepared in a dissolver. After 0.3% by weight preservative based on triazolidinopyridazinedione derivatives and 0.7% by weight potassium triphosphate have been added, 3.5% by weight mineral fibers (diameter 2–12 μm, length 0.1–3000 μm) and then 1% by weight polyacrylonitrile fibers (diameter 5–20 μm, length 200–1200 μm) are added with stirring. After a dispersion time of 60 minutes, 4.5% by weight trioctyl phosphate, 15% by weight aluminium hydroxide, 10% by weight magnesium hydroxide, 3.5% by weight zinc hydroxystannate, 13.5% by weight talcum and 9% by weight calcined kaolin are added. A viscous cement suitable for the production of fireproof joints is obtained.

A 30 mm wide gap in a 100 mm thick concrete slab is filled on both sides to a depth of 40 mm with the cement thus produced. Loose mineral wool is packed between the strips of cement as backfilling.

In the fire test according to DIN 4102, Part 2, the joint has a fire resistance time of more than 90 minutes.

EXAMPLE 4

A pigment paste is prepared in a turbulent mixer from 20.8% by weight water, 0.4% by weight potassium triphosphate, 23.6% by weight of an 85% vinyl acetate/ethylene copolymer dispersion, 20% by weight magnesium hydroxide, 15% by weight aluminium hydroxide and 10% by weight calcium carbonate. 0.2% by weight galactomannan, 0.5% by weight preservative based on triazolidinopyridazinedione derivatives and 0.3% by weight mineral oil foam inhibitor are added to the paste formed with continued mixing. 5.7% by weight of a mixture of 12.3% by weight polyethylene fibers (diameter 5–20 µm, length 800–1500 µm) and 87.7% by weight ceramic fibers (diameter 0.5–15 µm, length 0.1–2000 µm) are then added and dispersed for 40 minutes. 3.5% by weight diphenyl decyl phosphate and 10% by weight calcium stearate are then introduced. A highly viscous fireproof coating is obtained. In the form of a dry film, it has a Shore A hardness of 78, a tensile strength of 1.0 N/mm$^2$ and an elongation at break of 20.8%. If cable routes filled with 6×2 0.6 mm$^2$ PE cables and protected over their entire length with 3 mm (dry layer thickness) of the highly viscous fireproofing coating are subjected to the fire test according to DIN 4102, Part 1, a residual length of more than 15 cm and a smoke temperature of <200° C. are obtained.

EXAMPLE 5

Three cable conductors and a cable saddle filled with cables in accordance with DIN 4102, Part 9, pass through a 40×70 cm opening in a 20 cm thick masonry wall. The remaining space between cable routes/cables and wall is first closed with mineral fiber boards (thickness 60 mm, density 150 kg/m$^3$), which are cut accurately to size, in such a way that the wall surfaces are flush with the surface of the mineral fiber boards. The remaining gaps between the mineral fiber board adaptors and the wall and the cable routes/cables are filled with a fireproof cement according to Example 3. The entire surface of the mineral fiber boards is then coated with a fireproofing compound according to Example 4 in a dry layer thickness of 3 mm. The same coating compound is similarly applied to the cable carrying assembly and to the cables over a length of 50 cm from the surface of the mineral fiber boards. If the component thus produced is subjected to a fire test, it meets all the requirements of DIN 4102, Part 9, for a period of more than 90 minutes.

We claim:

1. An aqueous fireproofing composition, which dries to form a fireproof material, which composition is a mixture comprising:
   (a) 5–20% by weight, based on the dry weight of a resin, of a binder resin dispersion;
   (b) 10–60% by weight of a particulate flameproofing agent;
   (c) 0.2 to 27.5% by weight of non-asbestos inorganic fibers having an average length of 300 µm;
   (d) 0.1 to 10% by weight of a plasticizer; and
   (e) water, wherein the composition is free from antimony compounds, asbestos and halogen containing flame retardants.

2. A fireproofing composition as claimed in claim 1 wherein said composition is halogen-free.

3. A fireproofing composition as claimed in claim 1 wherein said binder resin comprises an aqueous dispersion of a synthetic resin.

4. A fireproofing composition as claimed in claim 1 wherein said binder comprises a halogen-free aqueous dispersion of a plastic or a synthetic resin.

5. A fireproofing composition as claimed in claim 1 said binder is a polymer.

6. A fireproofing composition as claimed in claim 5 wherein said polymer has a glass transition temperature Tg above −30° C., a minimum film forming temperature MFT of at least 0° C., a tensile strength not greater than 5 N/mm$^2$ and an elongation at break of at least 400%.

7. A fireproofing composition as claimed in claim 1 wherein said binder resin comprises an aqueous dispersion of a copolymer containing vinyl acetate residues.

8. A fireproofing composition as claimed in claim 1 wherein said binder resin comprises an aqueous dispersion of a copolymer of ethylene/vinyl acetate.

9. A fireproofing composition as claimed in claim 1 further comprising a thickening agent.

10. A fireproofing composition as claimed in claim 1 wherein said binder resin is present in a quantity of 7.5 to 15% by weight of dry resin based on the fireproofing composition as a whole.

11. A fireproofing composition as claimed in claim 1 wherein said flameproofing agent is halogen-free, nontoxic and free from toxicologically and ecologically unsafe heavy metal compounds.

12. A fireproofing composition as claimed in claim 11 wherein said flameproofing agent is insoluble in water.

13. A fireproofing composition as claimed in claim 1 wherein said flameproofing composition further comprises a thickening agent.

14. A fireproofing composition as claimed in claim 1 wherein said flameproofing agent is present in a quantity of 20 to 50% by weight, based on the weight of the fireproofing composition.

15. A fireproofing composition as claimed in claim 1 wherein said flameproofing agent comprises inorganic solids which react endothermally on heating.

16. A fireproofing composition as claimed in claim 15 wherein said flameproofing agent comprises inorganic solids which react endothermally on heating by melting, sublimation, phase transition or by a solid-state reaction.

17. A fireproofing composition as claimed in claim 15 wherein said inorganic solids react with elimination of non-flammable gases.

18. A fireproofing composition as claimed in claim 15 wherein said inorganic solids have an average particle diameter of 1 to 50 µm.

19. A fireproofing composition as claimed in claim 15 wherein said inorganic solids have an average particle diameter of 2 to 30 µm.

20. A fireproofing composition as claimed in claim 1 further comprising a filler and a thickener.

21. A fireproofing composition as claimed in claim 1 contains only inorganic fibers.

22. A fireproofing composition as claimed in claim 1 further comprising organic fibers.

23. A fireproofing composition as claimed in claim 22 wherein said fireproofing composition contains 0.1 to 20% by weight inorganic fibers and 0.1 to 7.5% by weight organic fibers, based on the weight of the fireproofing composition as a whole.

24. A fireproofing composition as claimed in claim 22 wherein said fireproofing composition contains 0.5 to 10% by weight inorganic fibers and 0.1 to 3.5% by weight organic fibers, based on the weight of the fireproofing composition as a whole.

25. A fireproofing composition as claimed in claim 24 wherein said organic fibers have an average thickness of 15 μm and an average length of 1000 μm.

26. A fireproofing composition as claimed in claim 1 wherein said plasticizer is comprised of a toxicologically safe phosphoric acid ester.

27. A fireproofing composition as claimed in claim 26 wherein said phosphoric acid ester has a P content of $\geq 7\%$.

28. A fireproofing composition as claimed in claim 26 wherein at least one acid function of said phosphoric acid ester is esterified with an aromatic group.

29. A fireproofing composition as claimed in claim 1 wherein said plasticizer is present in a quantity of 0.1% to 10% by weight, based on the fireproofing composition as a whole.

30. A fireproofing composition as claimed in claim 1 wherein said plasticizer is present in a quantity of 1% to 5% by weight, based on the weight of the fireproofing composition as a whole.

31. A fireproofing composition of claim 1 useful in the production of a fireproof material, said composition comprising:

(a) a binder comprised of an aqueous dispersion of a copolymer containing vinyl acetate residues (b) a flameproofing agent comprised of an inorganic solid which reacts endothermally on heating, (c) 0.1 to 20% by weight of of inorganic fibers, and (d) a plasticizer selected from the group of halogen-free phosphoric acid esters.

32. In a method for the production of a fireproof coating or a fireproof closure, the improvement comprising: forming a layer of the fireproofing composition of claim 1 and drying the composition.

33. A method as claimed in claim 32 wherein said fireproof coatings or fireproof closures are seals or pointings.

34. A dry, compact fireproofing material in the form of a coating and/or a fireproof closure produced by drying a fireproofing composition of claim 1.

35. A dry, compact fireproofing material as claimed in claim 34 wherein said material is chlorine-free.

36. A dry, compact fireproofing material as claimed in claim 34 wherein said material changes from a soft and flexible state into a hard and brittle state at a temperature of 100° C. to 800° C.

37. A dry, compact fireproofing material as claimed in claim 34 wherein said material is water-resistant and weather-resistant, shows permanent flexibility and has an ablative effect.

* * * * *